(12) United States Patent
Kraft et al.

(10) Patent No.: US 10,256,480 B2
(45) Date of Patent: Apr. 9, 2019

(54) FLOW ELEMENT AND BIPOLAR PLATE

(71) Applicant: ElringKlinger AG, Dettingen (DE)

(72) Inventors: Juergen Kraft, Metzingen (DE); Michael Goetz, Dettingen/Erms (DE); Manuel Morcos, Tuebingen (DE)

(73) Assignee: ElringKlinger AG, Dettingen (DE)

( * ) Notice: Subject to any disclaimer, the term of this patent is extended or adjusted under 35 U.S.C. 154(b) by 84 days.

(21) Appl. No.: 15/442,691

(22) Filed: Feb. 26, 2017

(65) Prior Publication Data

US 2017/0170492 A1 Jun. 15, 2017

Related U.S. Application Data

(63) Continuation of application No. PCT/EP2015/067859, filed on Aug. 3, 2015.

(30) Foreign Application Priority Data

Aug. 29, 2014 (DE) .......................... 10 2014 112 462

(51) Int. Cl.
*H01M 8/04* (2016.01)
*H01M 8/0263* (2016.01)
*H01M 8/0206* (2016.01)
*H01M 8/0265* (2016.01)
*H01M 8/0258* (2016.01)

(52) U.S. Cl.
CPC ....... *H01M 8/0263* (2013.01); *H01M 8/0206* (2013.01); *H01M 8/0265* (2013.01); *H01M 8/0258* (2013.01)

(58) Field of Classification Search
CPC ............. H01M 8/0263; H01M 8/0265; H01M 8/0258; H01M 8/0206
See application file for complete search history.

(56) References Cited

U.S. PATENT DOCUMENTS

| | | | |
|---|---|---|---|
| 5,776,625 A | 7/1998 | Kaufman et al. | |
| 6,048,634 A | 4/2000 | Kaufman et al. | |
| 6,099,984 A | 8/2000 | Rock | |
| 2003/0175577 A1* | 9/2003 | Rock ................... | H01M 8/0228 429/480 |
| 2003/0215692 A1 | 11/2003 | Rock et al. | |
| 2006/0099470 A1* | 5/2006 | Rapaport .............. | H01M 8/026 429/414 |

(Continued)

FOREIGN PATENT DOCUMENTS

| | | |
|---|---|---|
| DE | 102 29 820 A1 | 2/2004 |
| DE | 102 53 000 A1 | 6/2004 |

(Continued)

*Primary Examiner* — Ula C Ruddock
*Assistant Examiner* — Matthew W Van Oudenaren
(74) *Attorney, Agent, or Firm* — Aslan Law, P.C.

(57) ABSTRACT

In order to provide a flow element by means of which a fluid can be guided and/or distributed over a surface as uniformly as possible, it is proposed that the flow element comprises a plate-like main body, which has a channel structure, wherein the channel structure comprises two or more paths, which connect an inlet side of the channel structure to an outlet side of the channel structure, wherein the two or more channel paths each have one or more meandering segments, wherein meandering segments of channel paths different from each other are nested in each other.

12 Claims, 3 Drawing Sheets

(56) References Cited

U.S. PATENT DOCUMENTS

2006/0134502 A1*  6/2006  Garceau .............. H01M 8/0206
                                                       429/434
2006/0246341 A1  11/2006  Jorissen et al.
2007/0207366 A1   9/2007  Sommer et al.

FOREIGN PATENT DOCUMENTS

| DE | 10 2004 016 318 A1 | 10/2005 |
| DE | 10 2005 002 924 A1 | 7/2006 |
| DE | 10 2012 109 080 B3 | 12/2013 |
| WO | WO 97/42672 A1 | 11/1997 |
| WO | WO 2005/024985 A2 | 3/2005 |

* cited by examiner

FLOW ELEMENT AND BIPOLAR PLATE

RELATED APPLICATION

This application is a continuation of international application No. PCT/EP2015/067859 filed on Aug. 3, 2015, and claims the benefit of German application No. 10 2014 112 462.6 filed on Aug. 28, 2014, which are incorporated herein by reference in their entirety and for all purposes.

FIELD OF DISCLOSURE

The present invention relates to a flow element, which comprises a plate-like main body, which has a channel structure. By means of such a flow element, a fluid flow in particular is configured to be passed and/or distributed over a defined surface.

BACKGROUND

In particular, such a flow element can be used as a bipolar plate for an electrochemical device. The flow element serves here in particular to supply fuel or oxidiser and/or to remove exhaust gases.

Flow elements which have a meandering or serpentine-like channel structure are known for example from U.S. Pat. No. 5,776,625 A, from U.S. Pat. No. 6,099,984 A, from US 2003/0215692 A1 or from WO 2005/024985 A1.

SUMMARY OF THE INVENTION

The object of the present invention is to provide a flow element by means of which a fluid can be guided and/or distributed over a surface as uniformly as possible.

This object is achieved in accordance with the invention by a flow element which comprises a plate-like main body, which has a channel structure, wherein the channel structure has two or more channel paths, which connect an inlet side of the channel structure to an outlet side of the channel structure, wherein the two or more channel paths each have one or more meandering segments, wherein meandering segments of channel paths different from each other are nested in each other.

Since, in accordance with the invention, a plurality of meandering segments of channel paths different from each other are provided, which are nested in each other, a fluid is configured to be guided and/or distributed over a surface uniformly by means of the flow element.

A meandering segment, in this description and the accompanying claims, is understood in particular to mean a channel path segment which is guided or arranged in a meandering manner.

An arrangement of meandering segments nested in each other is preferably distinguished from meandering segments placed next to each other. In particular, in the case of an arrangement nested in each other, a theoretical separation of the channel paths (shifting of the channel paths away from each other) is possible at most in a single direction, whereas meandering segments placed next to other in theory can be moved away from each other contactlessly in a number of directions.

It can be advantageous if a meandering segment comprises two, three, or more channel path segments of a channel path, which are oriented substantially parallel to one another, are arranged side by side, and are configured to be passed through in succession by a fluid flow.

These two, three, or more channel path segments are preferably at least approximately linear.

An arrangement "side by side" is preferably understood to mean an arrangement in such a way that the channel path segments are arranged adjacently to one another in a direction which is oriented perpendicularly to the direction of flow of a fluid in the channel path segments.

A meandering segment preferably comprises two or more flow deflection segments of a channel path.

Provision can be made so that one or more indentations is/are formed by means of one or more channel paths, and one or more meandering segments of a further channel path extend into said indentation(s).

Provision can also be made so that one or more indentations is/are formed by means of one or more channel paths, and a plurality of meandering segments of a plurality of further channel paths extend into said indentation(s).

It can be favourable if the channel paths extend at least approximately exclusively along and/or opposite to two basic directions of the flow element oriented perpendicularly to one another.

In relation to the basic directions, one or more meandering segments of one or more channel paths is/are surrounded preferably on at least three sides by one or more further channel paths.

Provision can be made so that one or more indentations is/are formed by means of one or more channel paths and surrounds/surround one or more meandering segments of one or more further channel paths. In particular, three indentations edges can be provided, which delimit one or more meandering segments of one or more further channel paths.

It can be advantageous if the channel structure is formed by raised portions and/or recesses of the plate-like main body.

In particular, provision can be made so that channels and ribs are formed in the plate-like main body and form the channel structure.

In one embodiment of the invention, provision can be made so that the plate-like main body has at least approximately a constant material thickness at least in the region of the channel structure.

By way of example, provision can be made so that the channel structure is formed by shaping or converting an initially flat plate-like element. A material thickness of the main body is in particular substantially constant as a result. By way of example, a material thickness variation, in particular reduction, of at most approximately 50% is provided.

In particular, provision can be made so that the plate-like main body is a shaped sheet metal product.

Provision can be made so that the flow element comprises one or more flow transfer regions, at which fluid exits from one channel path and flows into a further channel path, i.e. in particular flows over a rib region between two channel paths.

Alternatively or additionally, provision can be made so that the flow element comprises one or more flow transfer regions, at which fluid exits from one channel path segment and flows into a further channel path segment of the same channel path.

What is key for the flowing of a fluid over a rib region between two channels, in particular channel path segments, is in particular a difference in pressure and/or a difference in the length of travel of the fluid between two adjacent channel path segments.

In particular, the fluid flows over a rib region between two channel path segments when the channel path segments are distanced differently from an inlet and/or outlet of a channel path along a path of flow of the fluid guided in said channel path.

In the event that the fluid flows over a rib region, the fluid is preferably passed through a gas diffusion layer (GDL) adjacent to the flow element. Due to the flowing of the fluid over a rib region between two channel paths or channel path segments, an advantageous fluid distribution in a coating or layer of an electrochemical device adjacent to the flow element is thus preferably provided.

It can be advantageous if, in order to selectively adjust a flow transfer between two channel paths or two channel path segments, a rib width between the channel paths or channel path segments is varied, adapted or adjusted.

By way of example, a targeted flow transfer region can be produced in that a rib region between two channel path segments narrows locally. Alternatively or additionally, a targeted flow transfer region can be produced in that a local enlargement and/or reduction of a channel cross-sectional area are/is provided.

It can be advantageous if at least one meandering segment has one or more flow transfer regions, in which a fluid guided in the meandering segment flows out from the channel path or channel path segment and can flow into a further channel path or channel path segment.

The flow element according to the invention is suitable in particular for use in a bipolar plate, in particular a bipolar plate for an electrochemical device.

An electrochemical device is in particular an electrochemical fuel cell device, for example a polymer electrolyte membrane (PEM) fuel cell device.

The bipolar plate according to the invention preferably has single or several of the features and/or advantages described in conjunction with the flow element according to the invention.

It can be favourable if the bipolar plate comprises one or more flow elements, in particular flow elements according to the invention.

However, provision can also be made so that the bipolar plate is formed from one or more flow elements according to the invention.

In one embodiment of the invention, provision can be made so that the bipolar plate comprises two flow elements connected to each other, which have channel structures different from each other.

Furthermore, the flow element according to the invention and/or the bipolar plate according to the invention can have single or several of the features and/or advantages described hereinafter:

It can be favourable if a meandering segment of a channel path forms a meandering sub-structure of a channel path.

The channel structure of the flow element in particular forms what is known as a flow field.

By means of a bipolar plate according to the invention, a reaction gas and/or coolant in particular can be distributed over a surface of a fuel cell uniformly. A medium is preferably guided in channels (channel paths) of the flow element. Ribs of the flow element arranged between the channels preferably form a mechanical support structure, in particular for supporting stacked and/or pressed components.

It can be advantageous if a fuel cell device comprises a combination of an anode-side bipolar plate, a cathode-side bipolar plate, and a membrane electrode unit, which is pressed between ribs (raised portions) of the anode-side bipolar plate and ribs (raised portions) of the cathode-side bipolar plate.

Due to the use of meandering segments, a length of one or more channel paths can preferably be increased. In addition, the surfaces can be covered by means of a lower number of channel paths. By lengthening the channel paths, a higher pressure loss can preferably be provided, thus resulting in a more uniform distribution of the flow of fluid among the different channel paths. By way of example, the proportion of the pressure loss over various channel paths can thus shift to a lesser extent if water droplets occur locally and temporarily.

Provision can be made so that the flow characteristics of a channel structure are selectively influenced by varying a channel width, channel shape, rib width and/or rib shape.

A channel path preferably comprises a plurality of meandering segments, which are arranged in succession in relation to a primary direction of flow. The orientation of the meandering segments is preferably selected such that an inlet side of one meander is adjacent to an outlet side of a further meander. In particular, the length of travel (distance along the channel path starting from an inlet side) can be adjusted as a result. It can be advantageous if channel structures having meandering segments of different width and having a different number of repetition units and/or a different nesting on a cathode side on the one hand and an anode side on the other hand are provided on a bipolar plate.

It can be advantageous if a flow element comprises meandering segments having straight-lined channel path segments of different length. A flow transfer between various channel path segments, meandering segments and/or various channel paths can thus preferably be selectively adjusted.

It can be advantageous if a flow element on a first side of a membrane electrode unit has a meandering channel structure, whereas a flow element on a further side, opposite said first side, has an exclusively straight-lined channel structure, for example.

In particular for the selective adjustment of a flow transfer over the ribs (raised portions), provision can be made so that a local rib width adaptation is made within a meandering segment.

It can be advantageous if meandering channel structures of different length, width and/or multiplicity are used on an anode side on the one hand and a cathode side on the other hand. Channel path segments formed from meandering segments different from each other can thus overlap each other. This can be used in order to homogenise the water distribution and/or temperature distribution over a cell, since the media in various channel path segments thus interact with one another.

It can be favourable if the channel structures of two flow elements, which in particular form a bipolar plate, have an identical periodicity and/or multiplicity. The rib widths and/or rib spacings of the two flow elements are preferably substantially constant, such that the flow elements, when placed against each other, abut one another by means of the respective rib regions.

Meandering segments nested in each other can be in particular meandering segments interleaved with each other.

By means of meandering segments nested in each other or interleaved with each other, a length of a channel path can preferably be reduced. By way of example, a shortest channel path length in a channel path guided individually as a meander (disregarding a flow field width) can be approximately three times the length of the channel structure in the flow direction. Due to the use of meandering structures nested in each other, the channel path length can be reduced, without limitation of the meander characteristics, for example to approximately twice the length of the channel structure in the direction of flow or approximately five thirds the length of the channel structure in the direction of flow.

Further preferred features and/or advantages of the invention are the subject of the following description and the presentation in the drawings of exemplary embodiments.

Like or functionally equivalent elements are provided in all drawings with the same reference signs.

DETAILED DESCRIPTION OF THE DRAWINGS

Figure 1:
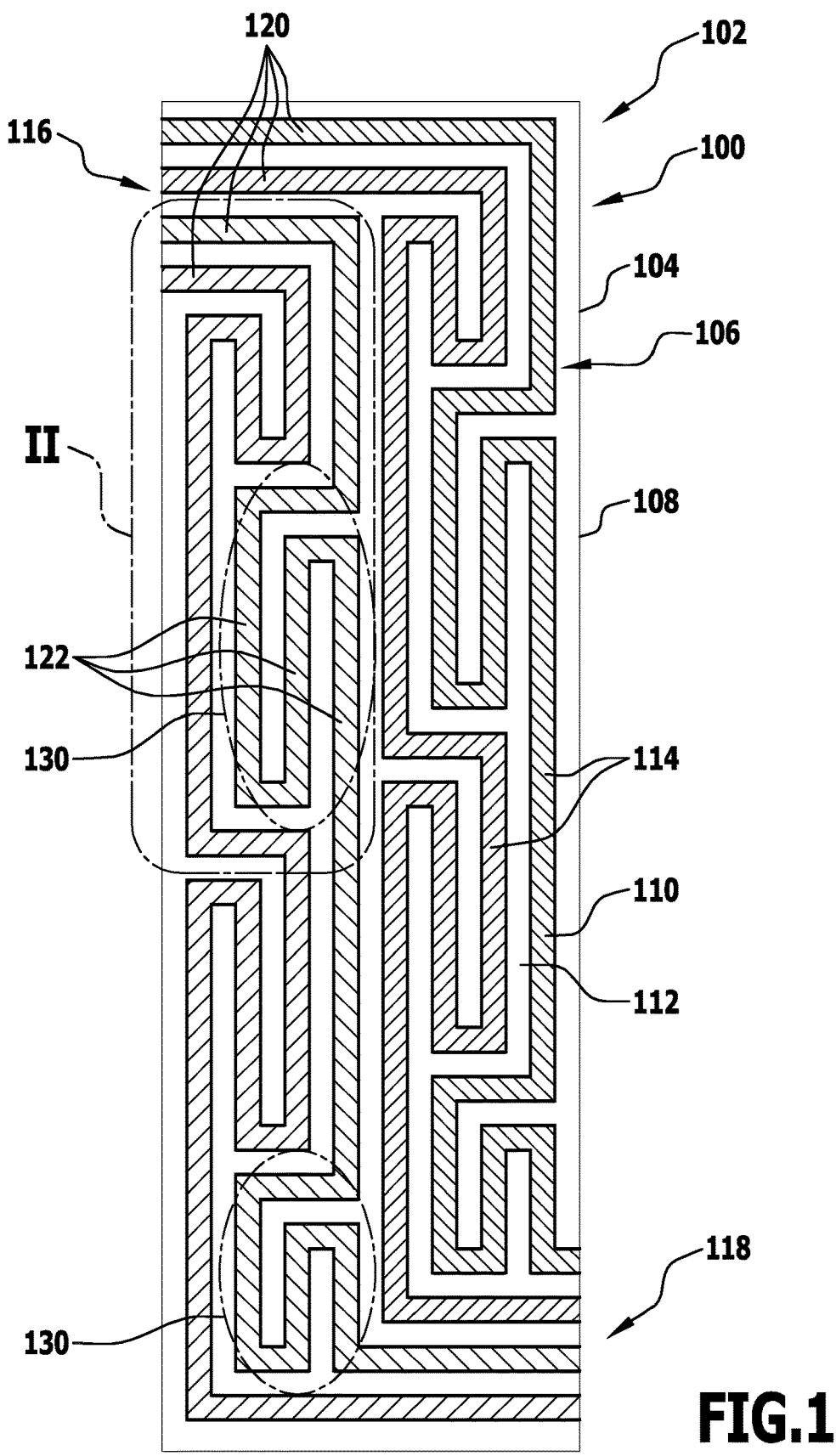
FIG. 1 shows a schematic illustration of a first embodiment of a flow element, which has a channel structure with meandering segments nested in each other.
Figure 2:
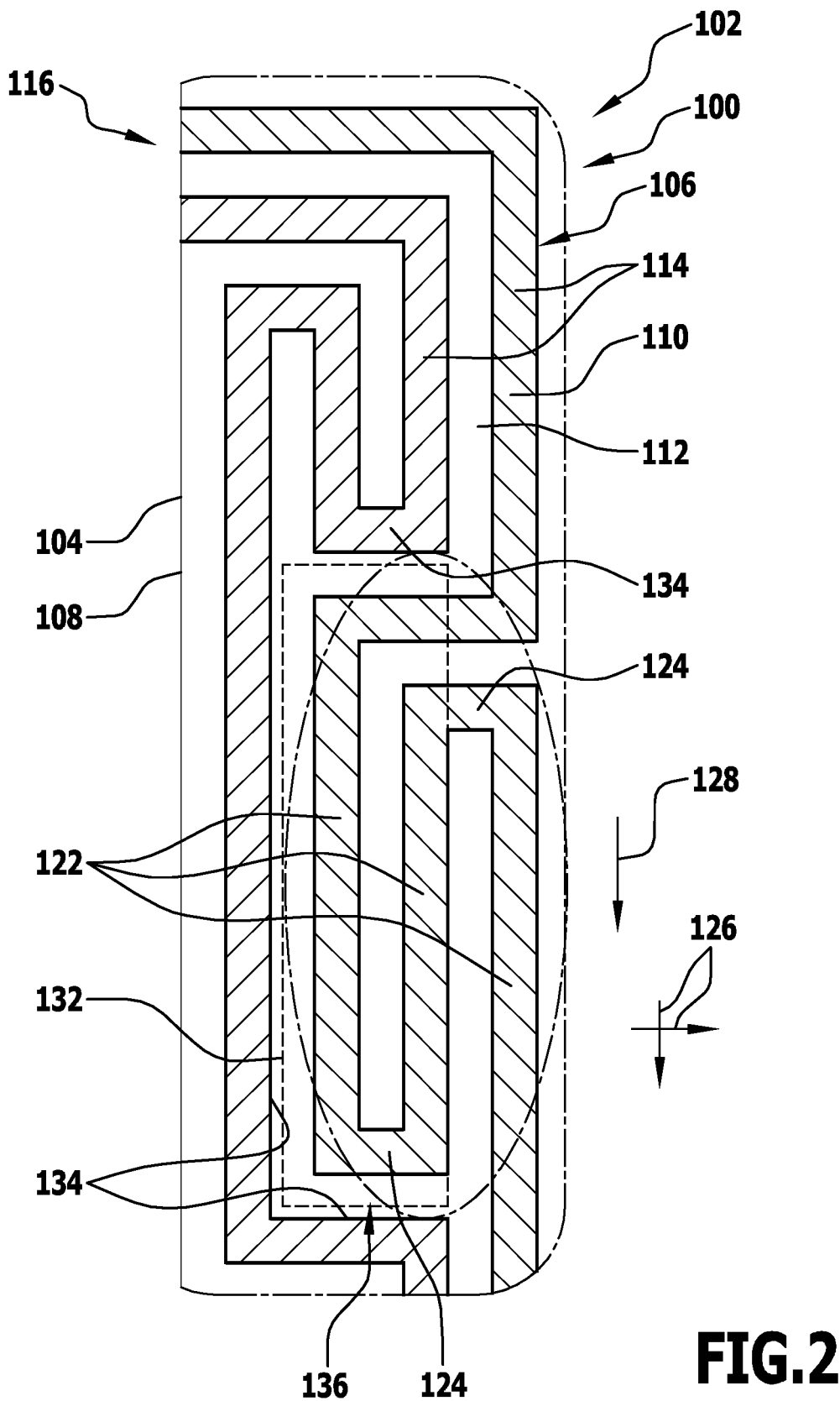
FIG. 2 shows an enlarged illustration of the region II in FIG. 1.

A first embodiment, illustrated in FIGS. 1 and 2, of a flow element denoted as a whole by 100 is for example part of a bipolar plate 102 of an electrochemical device, in particular a fuel cell device.

The flow element 100 comprises a plate-like main body 104, which has a channel structure 106.

The main body 104 is for example a shaped sheet metal product 108 and as such is produced or can be produced by converting an initially flat plate-like element.

The main body 104 in particular comprises a plurality of recesses 110 and raised portions 112.

The recesses 110 in particular form channels 114 of the channel structure 106.

A channel 114 of the channel structure 106, which extends continuously from an inlet side 116 of the flow element 100 to an outlet side 118 of the flow element 100, is referred to as a channel path 120.

In the first embodiment of a flow element 100 illustrated in FIGS. 1 and 2, four channel paths 120 are provided for example.

The channel paths 120 each comprise a plurality of channel path segments 122, in particular straight-lined or straight or linear channel path segments 122.

The channel paths 120 each also comprise a plurality of flow deflection segments 124

In the channel path segments 122, a fluid guided in the particular channel path 120 is guided in particular along or opposite to a basic direction 126 of the flow element 100.

The flow element 100 for example has two basic directions 126, which are oriented perpendicularly to one another and along and opposite to which the fluid can be guided in the channels 114.

A main direction of flow of the fluid, denoted as the direction of flow 128, is provided at least approximately by a main direction of extent of the channel path 120 or by the orientation of the straight-lined channel path segments 122 (see FIG. 2).

In particular, the direction of flow 128 is the direction along or opposite to which a majority of the straight-lined channel path segments 122 extends.

By means of the flow deflection segments 124, the flow direction 128 in a channel path 120 can be deflected for example, such that for example fluid guided initially along the direction of flow 128 in a straight-lined channel path segment 122 is deflected by 180° and is guided opposite to the direction of flow 128 in a laterally adjacently arranged further channel path segment 122. However, a flow deflection twice by 90° can also be provided.

One or more meandering segments 130 of a channel path 120 are formed by means of two or more channel path segments 122 arranged laterally adjacently in relation to the direction of flow 128 and by means of two or more flow deflection segments 124.

In the first embodiment, illustrated in FIGS. 1 and 2, of a flow element 100, two meandering segments 130 per channel path 120 are provided, by way of example.

The meandering segments 130 can have different dimensions from each other, in particular different lengths, whereby a selective flow adjustment in the flow element 100 can be made possible.

As can be derived in particular from FIG. 1, the meandering segments 130 of the channel paths 120 are arranged such that a meandering segment 130 of a channel path 120 is inserted between two meandering segments 130 of an adjacently arranged channel path 120.

The meandering segments 130 of channel paths 120 arranged adjacently to each other are thus nested in each other.

A channel path 120 in particular comprises at least one indentation 132, and a meandering segment 130 of an adjacently arranged channel path 120 extends into said indentation.

The channel path 120 forming the indentation 132 in particular forms three indentation edges 134, which surround the meandering segment 130, extending into the indentation 132, on three sides in relation to the basic directions 126.

The nested arrangement of the meandering segments 130 of channel paths 120 different from each other can offer the advantage that a flowing of fluid over ribs, in which case fluid from one segment of a channel path 120 passes over into another segment of the same or another channel path 120, is used to optimise the flow within the flow element 100.

The flow element 100 for this purpose preferably comprises one or more flow transfer regions 136, which in particular is/are formed between two channel path segments 122.

A flow transfer region 136 is in particular a region which is formed by a raised portion 112, in particular a rib, and consequently should hinder or prevent fluid from flowing through.

In particular as a result of differences in pressure and/or differences in the length of travel of the fluid in channel path segments 122 running adjacently to one another, a flow transfer is created in the flow transfer regions 136. This flow transfer in particular causes fluid to flow through an adjacent gas diffusion layer (GDL—not shown).

As can be derived in particular from FIG. 2, a flow transfer region 136 in particular allows fluid to pass over from one meandering segment 130 of a channel path 120 into a further separate channel path 120.

An optimised fluid distribution within the flow element 100 can be made possible as a result.

In the first embodiment of the flow element 100 illustrated in FIGS. 1 and 2, two channel paths 120 in each case are formed and arranged such that the meandering segments 130 thereof are nested in each other.

Figure 3:
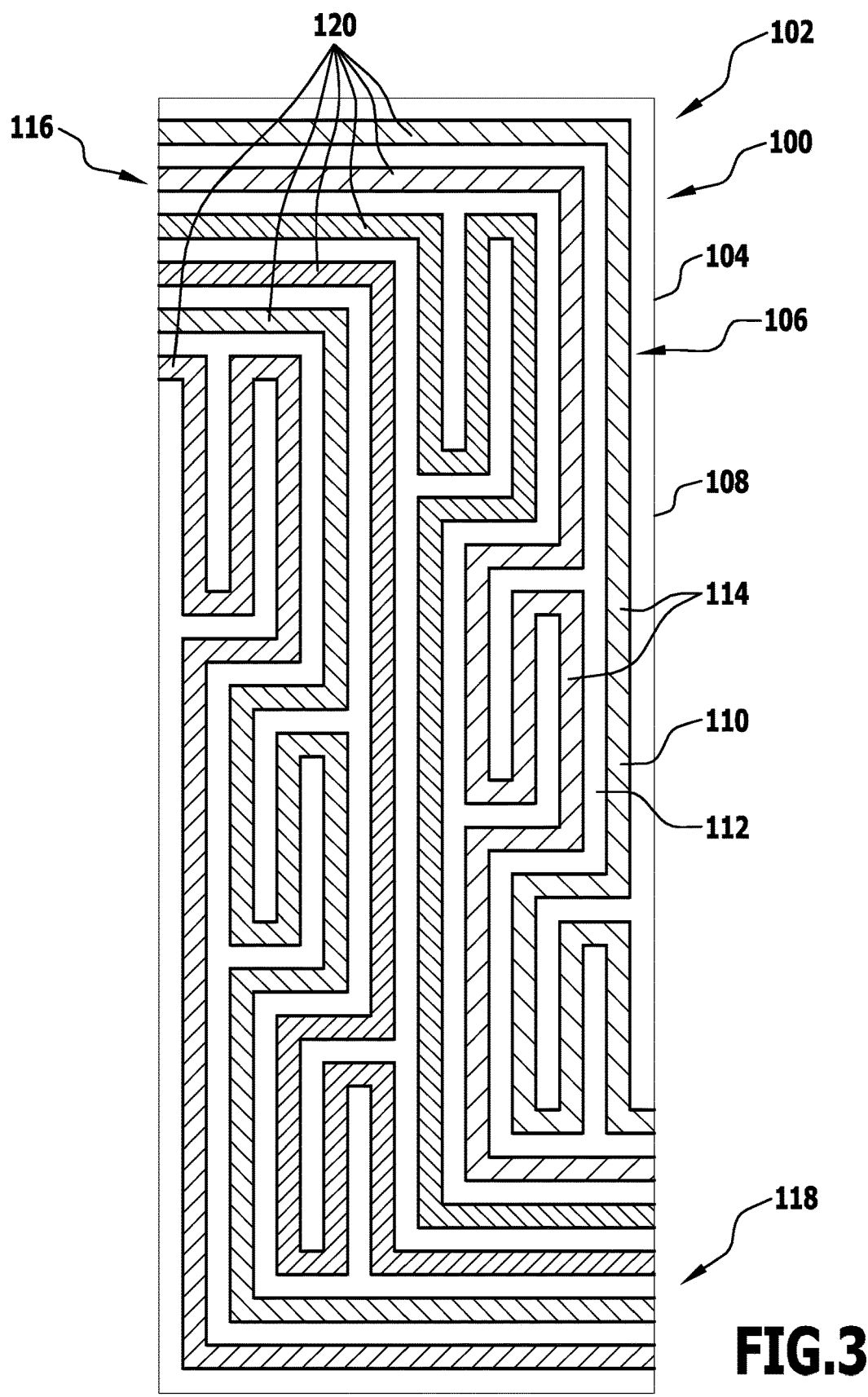
FIG. 3 shows a schematic illustration, corresponding to FIG. 1, of an alternative embodiment of a flow element.

A second embodiment, illustrated in FIG. 3, of a flow element 100 differs from the first embodiment illustrated in FIGS. 1 and 2 fundamentally in that three channel paths 120 are formed and arranged such that the meandering segments 130 thereof are nested in each other.

In addition, in the case of the embodiment of a flow element 100 illustrated in FIG. 3, a total of six channel paths 120 are provided, specifically two groups of three channel paths 120 each, with meandering segments 130 nested in each other.

Here, five laterally adjacent channel path segments 122 are covered by three channel paths 120. The length of an individual channel path 120 is thus approximately ⅗ of a total length of the channel structure 106.

For the rest, the second embodiment of a flow element 100 illustrated in FIG. 3 is the same as the first embodiment illustrated in FIGS. 1 and 2 in terms of structure and function, and therefore reference is made in this respect to the above description of said drawings.

The invention claimed is:

1. A flow element, comprising a plate-like main body, which has a channel structure,
    wherein the channel structure comprises two or more channel paths, which connect an inlet side of the channel structure to an outlet side of the channel structure,
    wherein the two or more channel paths each have one or more meandering segments,
    wherein meandering segments of channel paths different from each other are nested in each other,
    wherein the meandering segments of the channel paths are arranged such that a meandering segment of a channel path is inserted between two meandering segments of an adjacently arranged channel path,
    wherein a meandering segment comprises three or more channel path segments of a channel path, which are oriented parallel to one another, are arranged side by side, and are configured to be passed through in succession by a fluid flow, and
    wherein a meandering segment comprises two or more flow deflection segments of a channel path.

2. The flow element according to claim 1, wherein one or more indentations is/are formed by means of one or more channel paths, and one or more meandering segments of a further channel path extend into said indentation(s).

3. The flow element according to claim 1, wherein one or more indentations is/are formed by means of one or more channel paths, and a plurality of meandering segments of a plurality of further channel paths extend into said indentation(s).

4. The flow element according to claim 1, wherein the channel paths extend exclusively along and/or opposite to two basic directions of the flow element oriented perpendicularly to each other.

5. The flow element according to claim 4, wherein, in relation to the basic directions, one or more meandering segments of one or more channel paths is/are surrounded at least on three sides by one or more further channel paths.

6. The flow element according to claim 1, wherein the channel structure is formed by raised portions and/or recesses of the plate-like main body.

7. The flow element according to claim 1, wherein the plate-like main body, at least in the region of the channel structure, has a constant material thickness.

8. The flow element according to claim 1, wherein the plate-like main body is a shaped sheet metal product.

9. The flow element according to claim 1, wherein the flow element has one or more flow transfer regions, in which a fluid guided in a channel path segment of a channel path flows out from the channel path segment and flows over into a further channel path segment of the same channel path or of a further channel path.

10. The flow element according to claim 1, wherein channel path segments of the channel paths and/or the channel paths themselves are separated from one another by ribs, wherein the ribs have locally varying rib widths between one or more straight channel path segments.

11. A bipolar plate for an electrochemical device, comprising one or more flow elements according to claim 1.

12. The bipolar plate according to claim 11, wherein the bipolar plate comprises two flow elements connected to each other, which have channel structures formed differently from each other.

* * * * *